(12) United States Patent
Collins et al.

(10) Patent No.: US 7,049,515 B1
(45) Date of Patent: May 23, 2006

(54) GROMMETS FOR SEALING A HOLE IN AN ELECTRICAL DEVICE HOUSING THROUGH WHICH ELECTRICAL CONNECTORS EXIT

(75) Inventors: Michael T. Collins, St. Louis, MO (US); Stanley Duke Snider, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 11/133,574

(22) Filed: May 20, 2005

(51) Int. Cl.
*H02G 3/18* (2006.01)

(52) U.S. Cl. .................. 174/65 G; 174/50; 174/58; 174/153 G; 16/2.1; 248/56

(58) Field of Classification Search ............ 174/50, 174/53, 57, 58, 60, 64, 65 G, 65 R, 152 G, 174/153 G, 151; 220/3.2, 3.8, 4.02; 248/906, 248/56; 439/535; 16/2.1, 2.2
See application file for complete search history.

(56) References Cited

U.S. PATENT DOCUMENTS

| | | | |
|---|---|---|---|
| 3,751,579 A | * | 8/1973 | Nojiri .................. 174/153 G |
| 5,519,273 A | | 5/1996 | Keck |
| 6,143,983 A | | 11/2000 | Burton et al. |
| 6,147,307 A | * | 11/2000 | Ling et al. ............. 174/65 G |

* cited by examiner

*Primary Examiner*—Dhiru R. Patel
(74) *Attorney, Agent, or Firm*—Harness, Dickey & Pierce, P.L.C.

(57) ABSTRACT

A grommet is provided for insertion into a hole defined through and surrounded by a housing wall of an electrical device through which one or more electrical connectors exit. The grommet generally includes first and second legs connected by a connecting portion. The first and second legs have flange portions and lip portions extending outwardly from the first and second leg's end portions generally opposite the connecting portion. The flange and lip portions collectively define at least one groove for receiving a portion of the housing wall. The grommet also includes a slit extending at least partially between the first and second legs, and at least one aperture for engagingly receiving at least one electrical connector therethrough. The grommet, when engaged with the hole, seals against the housing wall and the electrical connector within the aperture to thereby inhibit the ingress of moisture through the hole.

23 Claims, 6 Drawing Sheets

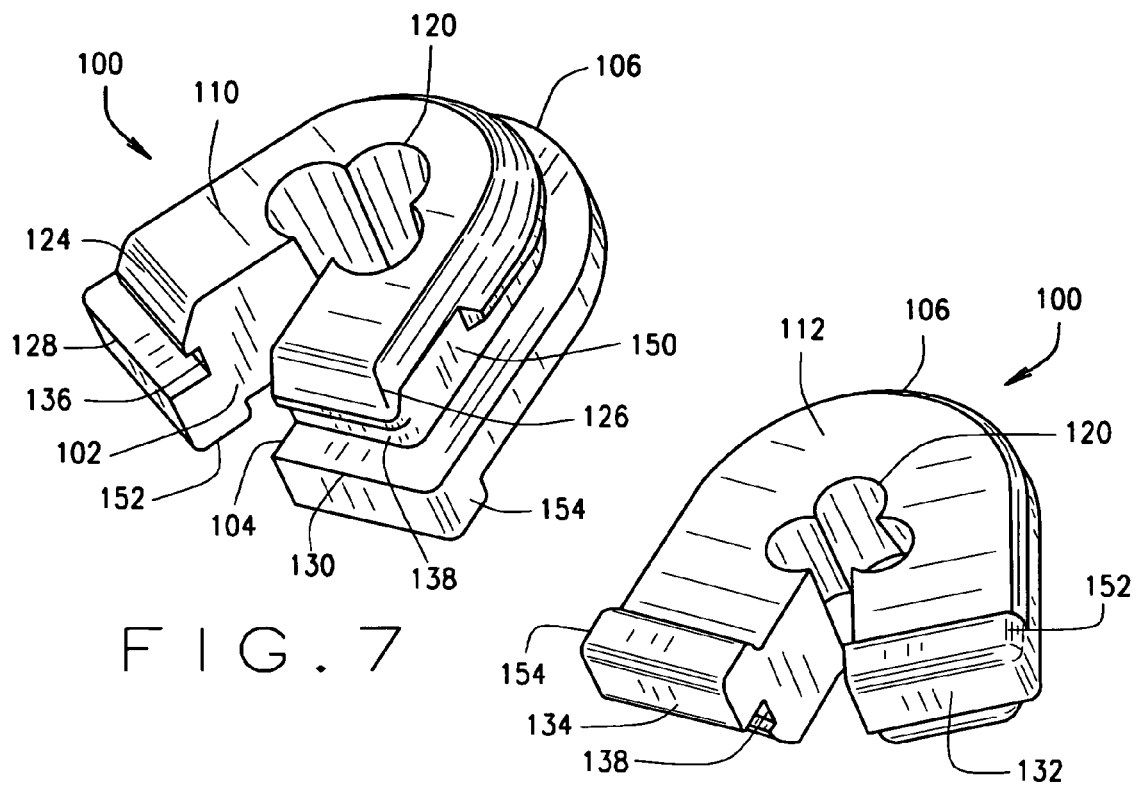
FIG. 7
FIG. 8
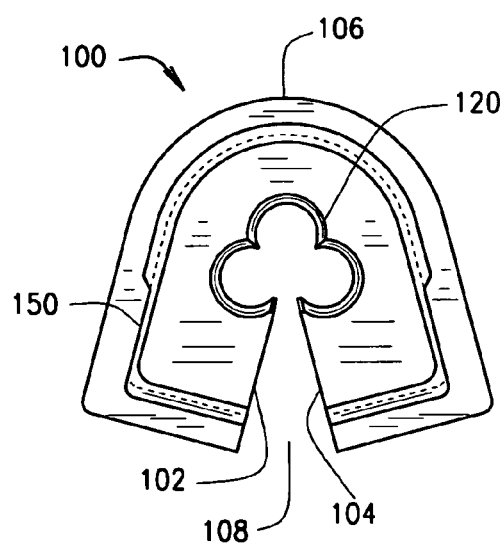
FIG. 9
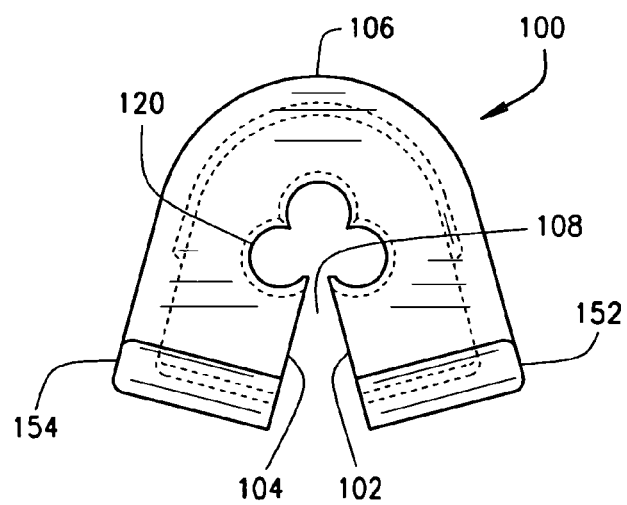
FIG. 10

GROMMETS FOR SEALING A HOLE IN AN ELECTRICAL DEVICE HOUSING THROUGH WHICH ELECTRICAL CONNECTORS EXIT

FIELD OF THE INVENTION

The present invention relates to grommets that can be inserted into a hole in a housing wall of an electrical device through which one or more electrical connectors exit to thereby seal the hole from the exterior environment, for example, to inhibit the ingress of moisture through the hole.

BACKGROUND OF THE INVENTION

Electric machines typically include a stator assembly having one or more stator windings, and a rotor assembly rotatably mounted within the stator assembly. It is also common for electric machines to include clamshell-type housings that surround or enclose the stator assembly. To connect the stator windings to an external power source, electrical connectors or leads are commonly inserted through an open-ended notch formed in one of the housing's clamshell halves. If the notch is not adequately sealed, however, the notch provides ingress for moisture and foreign objects and debris, such as dirt and oil. Therefore, many electric machines include some means of sealing the notch to thereby protect the internal machine components from exposure to the exterior environment.

For example, FIGS. 1 through 6 illustrate a grommet 10 that can be positioned within an open-ended notch 14 (FIG. 5) defined by the one of the housing portions 18, 22 of a clamshell-type housing 26 (FIG. 6). As shown, the grommet 10 includes a groove 30 for receiving the housing wall 34. The grommet 10 can be retained within the open-ended notch 14 by sandwiching the grommet 10 between the upper and lower housing portions 18 and 22.

While grommets such as the grommet 10 shown in FIGS. 1 through 6 have worked well for their intended purpose, the inventors hereof have recognized that it would be desirable to have a grommet that can be inserted into a hole defined and surrounded by a wall of only one of the housing portions such that the hole has a perimeter with a closed geometry (in contrast to an open-ended notch), thereby allowing each housing portion to have a full uninterrupted hoop that is not impinged by the hole.

SUMMARY OF THE INVENTION

According to one aspect of the invention, a grommet is provided that can be inserted into a hole defined through and surrounded by a housing wall of an electrical device through which one or more electrical connectors exit. In one embodiment, the grommet generally includes first and second legs connected by a connecting portion. The first and second legs have flange portions and lip portions extending outwardly from the first and second leg's end portions generally opposite the connecting portion. The flange and lip portions collectively define at least one groove for receiving a portion of the housing wall. The grommet also includes a slit extending at least partially between the first and second legs. The grommet further includes at least one aperture for engagingly receiving at least one electrical connector therethrough. When engaged with the hole, the grommet seals against the housing wall and the electrical connector within the aperture, thereby inhibiting the ingress of moisture through the hole. Additional aspects of the invention include electrical devices and apparatus that include grommets, and methods of using grommets.

Further aspects of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is an inner perspective view of a grommet according to one exemplary embodiment of the invention;

FIG. 8 is an outer perspective view of the grommet shown in FIG. 7;

FIG. 9 is an inner view of the grommet shown in FIG. 7;

FIG. 10 is a outer view of the grommet shown in FIG. 7;

DETAILED DESCRIPTION OF THE EXEMPLARY EMBODIMENTS

The following description of various embodiments is merely exemplary in nature and is in no way intended to limit the invention, its application, or uses.

According to one aspect of the invention, a grommet is provided that can be inserted into a hole defined through and surrounded by a housing wall of an electrical device through which one or more electrical connectors exit. In one embodiment, the grommet generally includes first and second legs connected by a connecting portion. The first and second legs have flange portions and lip portions extending outwardly from the first and second leg's end portions generally opposite the connecting portion. The flange and lip portions collectively define at least one groove for receiving a portion of the housing wall. The grommet also includes a slit extending at least partially between the first and second legs. The grommet further includes at least one aperture for engagingly receiving at least one electrical connector therethrough. When engaged with the hole, the grommet seals against the housing wall and the electrical connector within the aperture, thereby inhibiting the ingress of moisture, dirt, dust, etc. through the hole. Additional aspects of the invention include methods of using one or more grommets of the present invention. Further aspects of the invention include electrical devices, electrical apparatus, electric machines, electric motors, and electric generators that include one or more grommets of the present invention.

Accordingly, various embodiments of the present invention include grommets that can be inserted into a hole defined and surrounded by a wall of only one of the housing portions such that the hole has a perimeter with a closed geometry (in contrast to an open-ended notch). This, in turn, allows each housing portion to have a full uninterrupted hoop that is not impinged by the hole. In such embodiments, the grommet can be independently retained within the hole without the need for retention from the other housing portion. The grommet can also be inserted into the hole from outside the housing even after the housing's portions have been assembled to one another.

An exemplary grommet 100 is illustrated in FIGS. 7 through 14. As shown, the grommet 100 includes legs 102 and 104 connected by a connecting portion 106. The grommet 100 also includes a slit or notch 108 extending between the legs 102 and 104.

The connecting portion 106 is generally curved with the legs 102 and 104 depending therefrom such that the grommet 100 has a generally U-shaped profile. Alternatively, other configurations (e.g., shapes, sizes, etc.) can be used for the grommet 100 depending, for example, on the particular shape and size of the hole into which the grommet 100 is to be positioned. For example, another embodiment includes a grommet having a generally rectangular profile. Or, for example, another embodiment includes a grommet having a generally circular profile.

Figure 15:
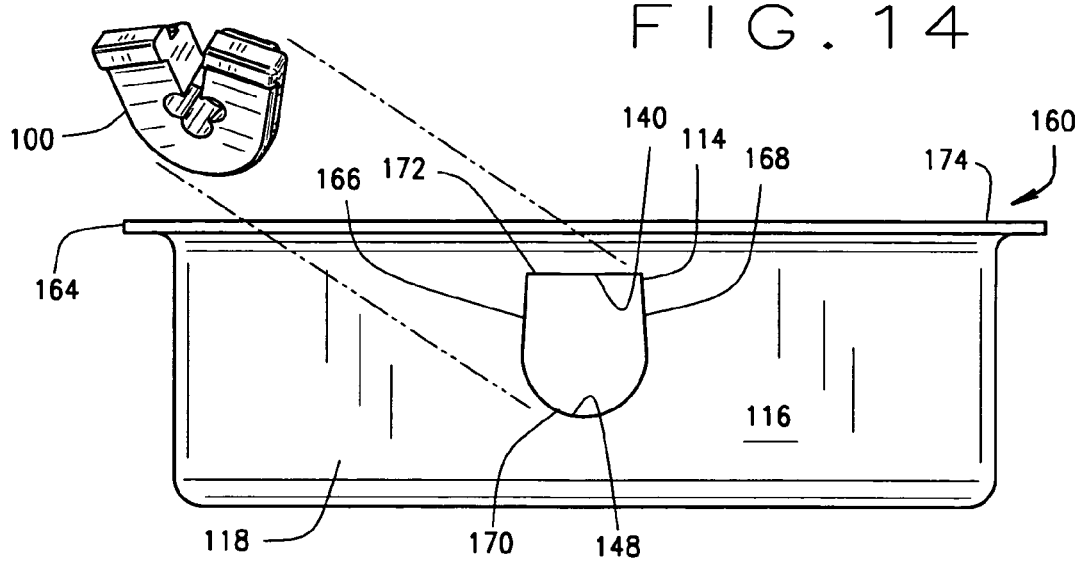
FIG. 15 is an exploded view illustrating the grommet shown in FIG. 1 being positioned within a hole defined by a lower portion of a housing.

With continued reference to FIGS. 7 trough 14, the grommet 100 includes an inner body portion 110 (FIG. 7) having a periphery adapted to be inserted through the hole 114 (FIG. 15). The grommet 100 also includes an outer body portion 112 (FIG. 8) having a periphery complimentary in shape to the inner body portion 110. But the periphery of outer body portion 112 is larger (e.g., wider, etc.) than the periphery of the inner body portion 110.

Figure 16:
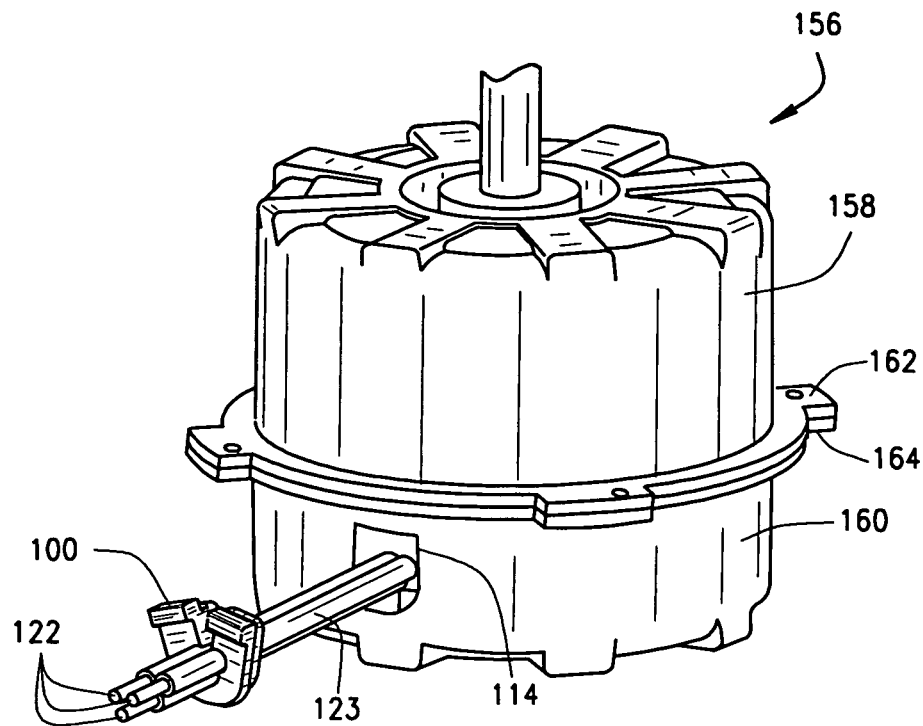
FIG. 16 is an exploded perspective view illustrating the grommet shown in FIG. 1 being positioned within a hole defined by a lower portion of a housing after the housing's upper and lower portions have been assembled to one another.
Figure 17:
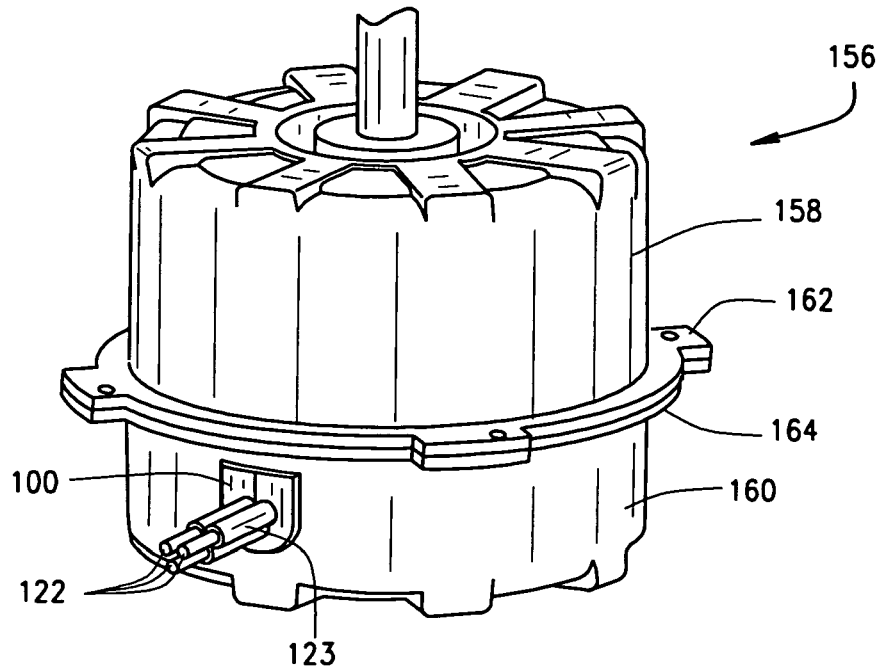
FIG. 17 is a perspective view illustrating the grommet positioned within the hole defined by the lower housing portion shown in FIG. 16.
Figure 19:
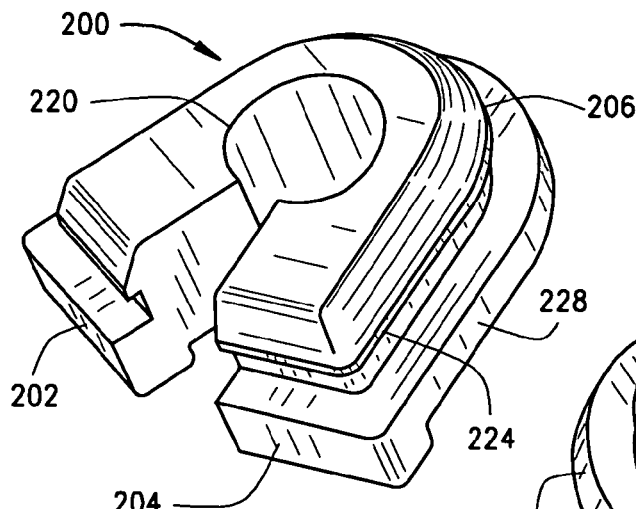
FIG. 19 is an inner perspective view of a grommet according to another exemplary embodiment of the invention.
Figure 20:
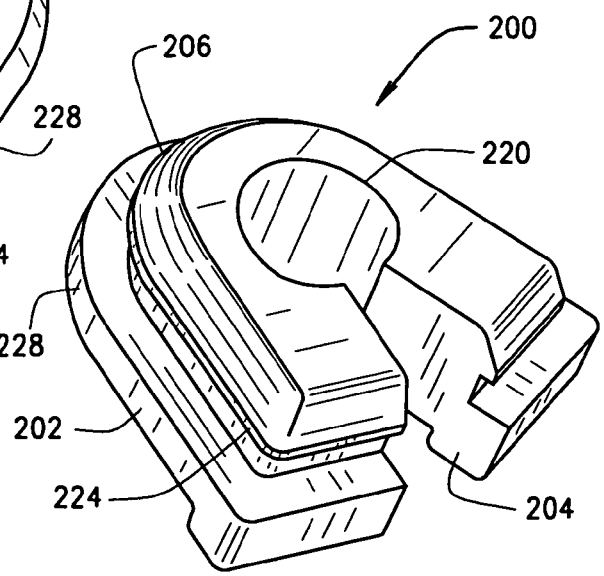
FIG. 20 is another inner perspective view of the grommet shown in FIG. 19.

The grommet 100 further includes an aperture 120 for engagingly receiving electrical connectors 122 therethrough. As shown, the aperture 120 generally resembles the shape of a three-leaf clover. As shown in FIGS. 16 and 17, the aperture 120 can receive three electrical connectors 122. Alternatively, other configurations are possible for the aperture 120, including other shapes for receiving more or less than three electrical connectors. For example, FIGS. 19 and 20 illustrate another embodiment of a grommet 200 having a generally circular aperture 220.

In the illustrated embodiment, the sidewalls defining the aperture 120 are configured to conform around the leads 122 when the grommet 100 is positioned within the hole 114 (FIG. 15). As shown in FIGS. 9 and 10, the sidewalls defining the aperture 120 are outwardly tapered. In this particular example, the sidewalls can thus conform and seal against the leads 122 when the grommet 100 is engaged within the hole 114 (FIG. 15). In addition, this sidewall tapering can also help retain the position of the electrical leads 122 relative to the hole 114. Further, the grommet 100 can help protect the electrical insulation 123 (FIGS. 16 and 17) of the leads 122 from being scraped or cut by an exposed edge of the hole 114.

With continued reference to FIGS. 9 and 10, the slit 108 extends between the legs 102 and 104 and into the aperture 120. Advantageously, this feature allows the leads 122 to be relatively quickly positioned within the aperture 120 by way of the slit 108. Rather than having to thread the length of the leads 122 through the aperture 120, the electrical connectors 122 can instead be relatively quickly positioned through the slit 108 into the aperture 120.

In addition, the slit 108 also allows the legs 102 and 104 to be moved or compressed towards one another. When the grommet 100 is positioned within the hole 114 (FIG. 15), the hole's sidewalls 166 and 168 compress and reduce the reduce width the slit 108 such that the legs 102 and 104 contact and abut against one another. This reduction in slit width facilitates positioning of the grommet 100 within the hole 114. In addition, the contacting engagement of the legs 102 and 104 also inhibits the ingress of moisture through the slit 108.

In one particular embodiment, the angle between the opposing sides of the slit 108, when uncompressed, is about thirty degrees (FIGS. 9 and 10). This dimension (as are all dimensions set forth herein) is a mere example and can be varied as understood by those skilled in the art.

As shown in FIG. 7, the grommet's legs 102 and 104 include respective flange portions 124, 126 and lip portions 128, 130. The flange and lip portions 124, 126, 128, 130 extend outwardly from the respective leg end portions 132, 134 generally opposite the connecting portion 106.

The first leg's flange and lip portions 124 and 128 collectively define a first groove 136 along the first leg's end portion 132. The second leg's flange and lip portions 126 and 130 collectively define a second groove 138 along the second leg's end portion 134. These grooves 136 and 138 are configured (e.g., sized, shaped, positioned) to receive the housing wall portion 140 when the grommet 100 is positioned within the hole 114 (FIG. 15). When the housing wall portion 140 is received within the grooves 136, 138, the flange portions 124, 126 are adjacent the housing wall's outer surface 116, and the lip portions 128, 130 are adjacent the housing wall's inner surface.

Figure 14:
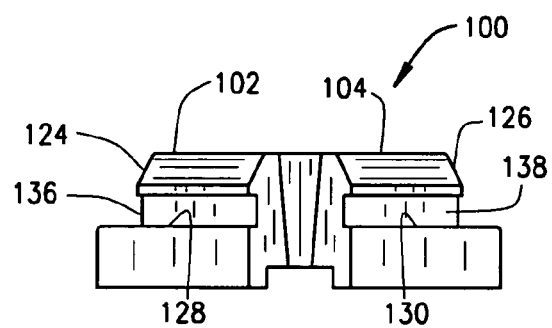
FIG. 14 is a bottom view of the grommet as shown in FIG. 7.

As shown in FIGS. 7 and 14, the flange portions 124, 126 are beveled or chamfered, which facilitates the positioning of the flange portions 124, 126 through the hole 114. In one particular embodiment, the flange portions 124, 126 are beveled or chamfered at an angle of about fifty-five degrees from the grommet's upper surface as shown in FIG. 7. This dimension (as are all dimensions set forth herein) is a mere example and can be varied as understood by those skilled in the art.

Figure 1:
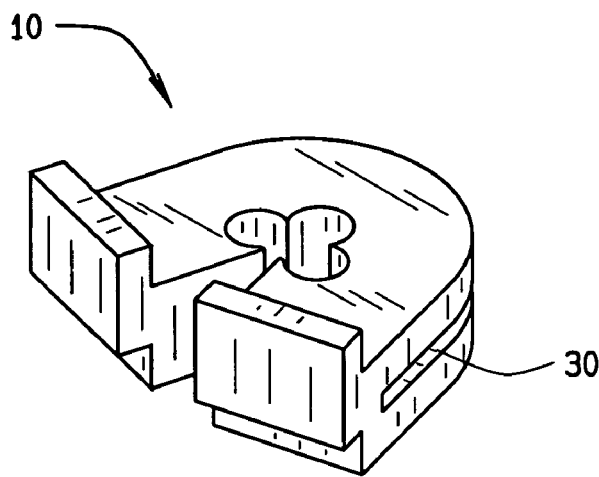
FIG. 1 is an outer perspective view of a conventional grommet that can be positioned within an open-ended notch defined by a housing.
Figure 2:
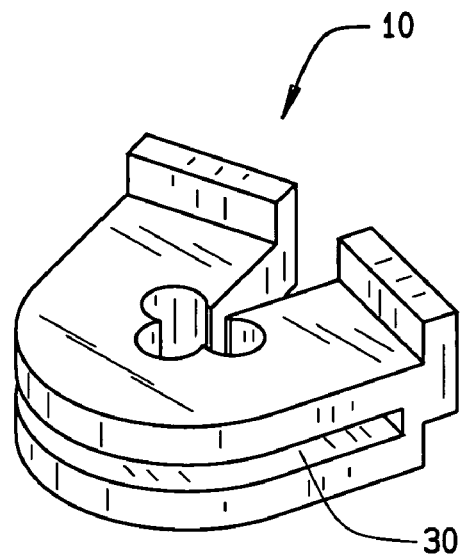
FIG. 2 is another outer perspective of the grommet shown in FIG. 1.
Figure 3:
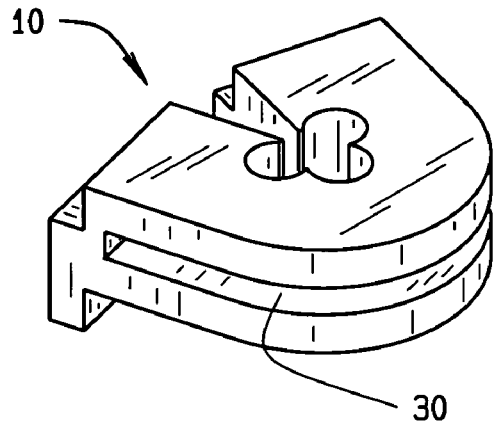
FIG. 3 is an inner perspective of the grommet shown in FIG. 1.
Figure 4:
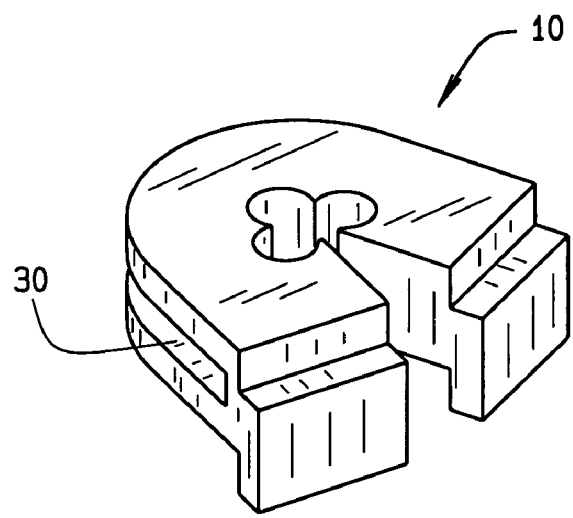
FIG. 4 is another inner perspective of the grommet shown in FIG. 1.
Figure 5:
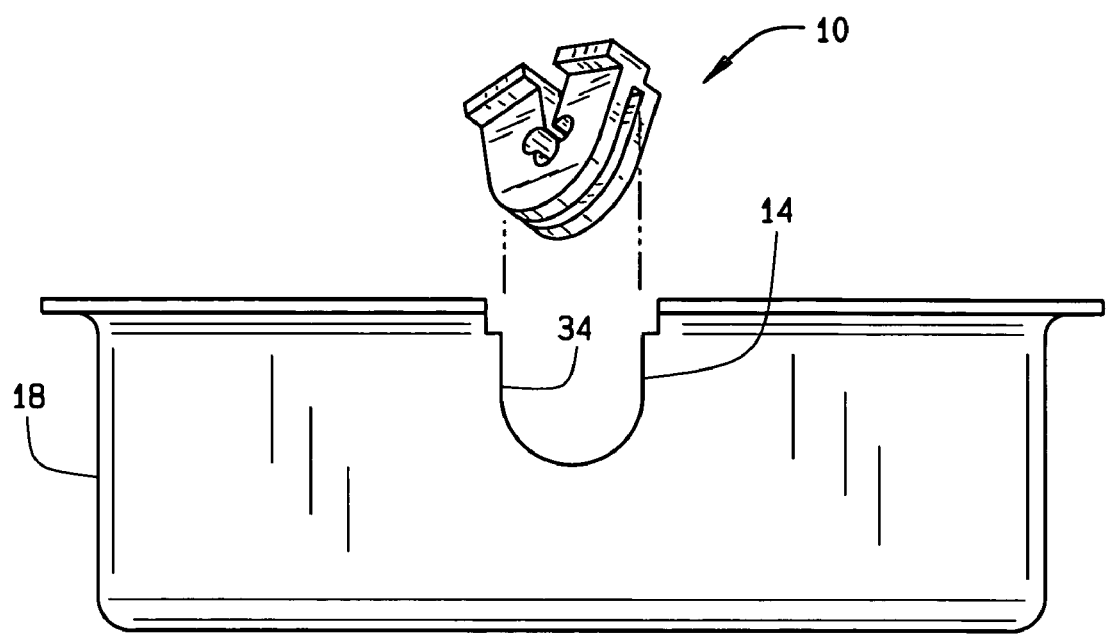
FIG. 5 is an exploded view illustrating the grommet shown in FIG. 1 being positioned within an open-ended notch of a lower portion of a clamshell-type housing.
Figure 6:
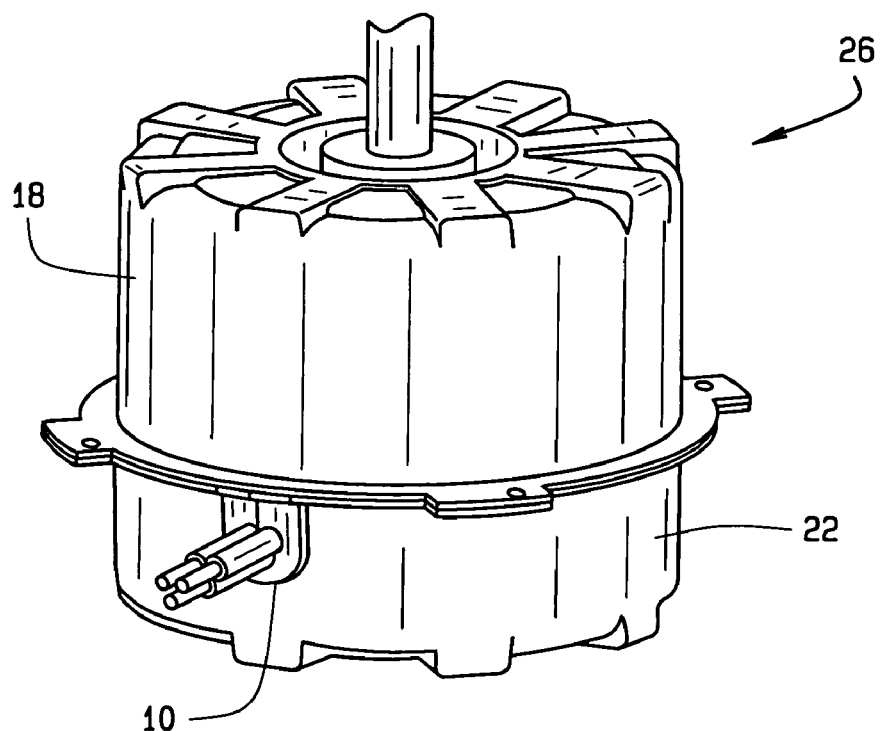
FIG. 6 is a perspective view illustrating the grommet shown in FIG. 1 positioned within an open-ended notch of a lower portion of the clamshell-type housing.
Figure 11:
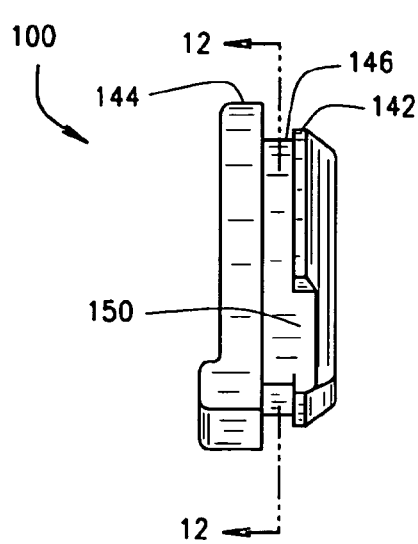
FIG. 11 is a side view of the grommet shown in FIG. 7.
Figure 12:
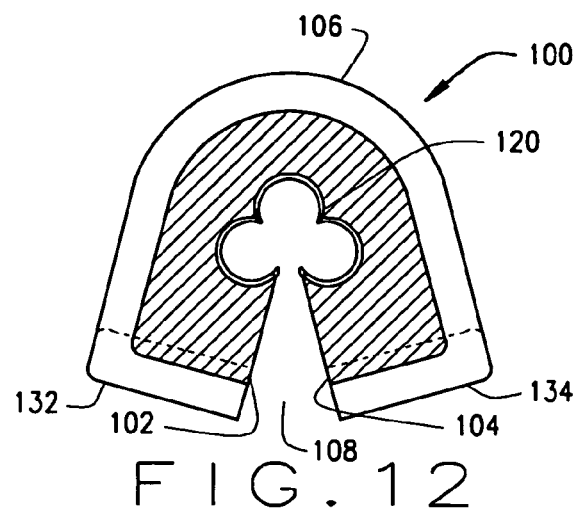
FIG. 12 is a cross-sectional view of the grommet taken along the line 12—12 in FIG. 11.
Figure 13:
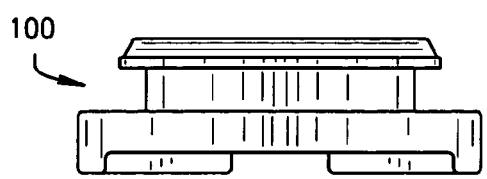
FIG. 13 is a top view of the grommet as shown in FIG. 7.

As shown in FIGS. 11 and 13, the connecting portion 106 also includes a flange portion 142 and a lip portion 144. The flange and lip portions 142, 144 extend outwardly from the connecting portion 106. The flange and lip portions 142, 144 collectively define a groove 146. The groove 146 is configured (e.g., sized, shaped, and positioned) to receive the housing wall portion 148 (FIG. 15) when the grommet 100 is positioned within the hole 114. When the housing wall portion 148 is received within the groove 146, the flange portion 142 is adjacent the housing wall's outer surface 116, and the lip portion 144 is adjacent the housing wall's inner surface.

The first and second leg's flange portions 124, 126 are spaced apart from the connecting portion's flange portion 142 such that reliefs or notches 150 are defined therebetween. These reliefs 150 facilitate the positioning of the grommet 100 within the hole 114.

Alternative embodiments, however, do not include such reliefs or notches. For example, FIGS. 19 and 20 illustrate a grommet 200 having a single flange 224 that extends outwardly along the periphery defined by the legs 202, 204 and the connecting portion 206. The grommet 200 also includes a single lip 228 that extends outwardly along the periphery. The flange and lip 224, 228 collectively define a groove 236 for receiving the housing wall surrounding the hole into which the grommet 200 will be positioned. The flange and lip 224, 228 can be configured to make contacting engagement with the housing wall along the entire periphery of the hole into which the grommet 200 is positioned.

Referring back to FIGS. 7 and 8, the grommet 100 includes ribs 152, 154 respectively protruding from the flange portions 124, 126. The ribs 152, 154 help maintain the flange portions 124, 126 in a generally flat orientation when the grommet 100 is compressively engaged within the hole 114.

A wide range of materials can be used for the grommet 100. In one exemplary embodiment, the grommet 100 comprises Santoprene® 101-73 black thermoplastic rubber, which is a material available from Advanced Elastomer Systems, L.P. of Akron, Ohio. Alternatively, other materials can be used for the grommet 100 including elastomers and rubber materials.

FIGS. 16 and 17 illustrate an exemplary housing 156 having the hole 114 into which the grommet 100 may be positioned. As shown, the housing 156 is a clamshell-type housing having first and second portions 158 and 160. In the illustrated embodiment, the grommet 100 can be inserted and independently retained within the hole 114 without the need for retention from the other housing portion 160. Further, the grommet 100 can also be inserted into the hole 114 from outside the housing 156 before, after, or as the housing portions 158 and 160 are assembled to one another.

The hole 114 is surrounded by the housing wall 118 of the housing portion 158 such that the hole 114 is spaced apart from the interface between the housing portions 158 and 160. Accordingly, each housing portion 158 and 160 includes a full uninterrupted hoop 162, 164, respectively, that is not impinged by the hole 114. Advantageously, having full uninterrupted hoops 162, 164 can aid in concentricity by allowing the housing portions 158, 160 to be aligned with the stator core, thereby eliminating the need for alignment pins. This, in turn, allows the assembly process to be streamlined as compared to some existing designs in which the clamshell halves must be aligned with alignment pins to maintain concentricity before the clamshell halves are mechanically fastened to one another.

Figure 18:
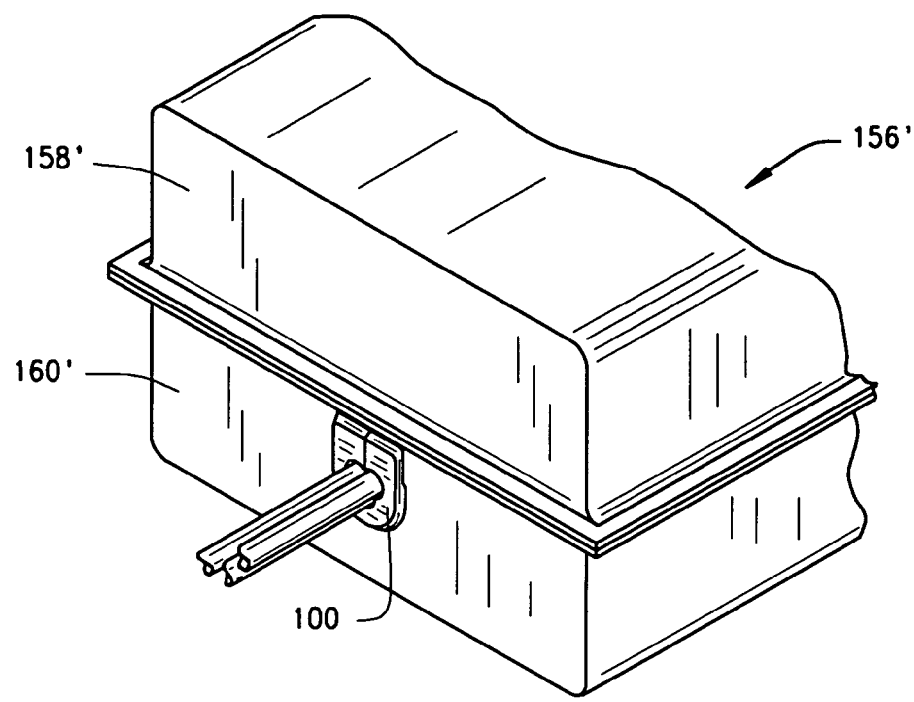
FIG. 18 is a partial perspective view illustrating the grommet shown in FIG. 1 positioned within a hole defined by a lower portion of a housing according to another exemplary embodiment of the invention.

Alternatively, the grommet 100 can be used with other housings besides the clamshell-type housing shown in FIGS. 15 and 16. For example, FIG. 18 illustrates the grommet 100 being used with a housing 156' having generally rectangular upper and lower portions 158' and 160'. Accordingly, aspects of this invention should not be limited to any particular type and/or kind of housing.

As shown in FIG. 15, the hole 114 is generally D-shaped with inwardly tapered side portions 166 and 168. The hole 114 is preferably configured to compress the grommet 100 when the grommet 100 is positioned within the hole 114. That is, the sidewall portions 166 and 168 compressively squeeze the grommet's legs 102 and 104 towards one another, thereby squeezing the grommet 100 over the leads 122. The compression of the grommet 100 can also produce a restoring force that biases the periphery of the grommet 100 against the housing wall 118. In some embodiments, the grommet 100 is configured for contacting engagement with the housing wall 118 along the entire periphery of the hole 114. Accordingly, the grommet 100 is able to provide an effective seal against the housing wall 118 and the leads 122, thereby sealing the hole 114 from the exterior environment, for example, to inhibit the ingress of moisture, dirt, dust, etc. through the hole 114.

In one particular embodiment, the side portions 166 and 168 of the hole 114 taper inwardly from a bottom 170 to a top 172 of the hole 114 at a preferred angle of about three-degrees from vertical (FIG. 15). In addition, the top 172 of the hole 114 is preferably about 0.465 inches from the top surface 174 of the housing portion 158. These dimensions (as are all dimensions set forth herein) are mere examples and can be varied as understood by those skilled in the art.

Aspects of the present invention, however, can be used with alternative housing embodiments having one or more holes with a different configuration than that shown in FIG. 15. The particular hole configuration (e.g., size, shape, position, etc.) can vary depending, for example, on the particular application. Accordingly, aspects of this invention should not be limited to the particular hole 114 shown and described herein.

The teachings of the present invention can be applied in a wide range of electrical devices and apparatus, including electric machines, electric motors, and electric generators. Accordingly, the specific references to clamshell-type housings should not be construed as limiting the scope of the present invention to any specific form/type of machine or machine housing.

Certain terminology is used herein for purposes of reference only, and thus is not intended to be limiting. For example, terms such as "upper", "lower", "above", and "below" refer to directions in the drawings to which reference is made. Terms such as "front", "back", "rear", "top", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present invention and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A grommet for insertion into a hole defined through and surrounded by a housing wall of an electrical device through which one or more electrical connectors exit, the grommet comprising first and second legs connected by a connecting portion, the first and second legs having flange portions and lip portions extending outwardly from the first and second leg's end portions generally opposite the connecting portion, the flange and lip portions collectively defining at least one groove for receiving a portion of the housing wall, a slit extending at least partially between the first and second legs, and at least one aperture for engagingly receiving at least one electrical connector therethrough, whereby the grommet, when engaged with the hole, seals against the housing wall and the electrical connector within the aperture to thereby inhibit the ingress of moisture through the hole.

2. The grommet of claim 1 wherein the grommet includes an inner body portion having a periphery adapted to be inserted through the hole, and an outer body portion having a periphery complementary in shape to but larger than the inner body portion's periphery.

3. The grommet of claim 1 wherein the connecting portion is generally curved with the first and second legs depending therefrom such that the grommet has a generally U-shaped profile.

4. The grommet of claim 1 wherein the flange portions are beveled to facilitate positioning of the flange portions through the hole.

5. The grommet of claim 1 wherein the connecting portion includes a flange portion and a lip portion collectively defining at least one groove for receiving a portion of the housing wall.

6. The grommet of claim 5 wherein the first and second legs' flange portions are each spaced apart from the connecting portion's flange portion such that a relief is defined therebetween for facilitating positioning of the grommet within the hole.

7. The grommet of claim 5 wherein the connecting portion includes a generally continuous flange extending outwardly along a periphery defined by the first and second legs, the continuous flange including each said flange portion, wherein the grommet includes a generally continuous lip extending outwardly along the periphery, the continuous lip including each said lip portion, and wherein the continuous flange and lip collectively define a groove for receiving the housing wall.

8. The grommet of claim 1 wherein the first and second legs and the connecting portion are configured for contacting engagement with the housing wall along an entire periphery of the hole.

9. The grommet of claim 1 wherein the grommet includes an outer peripheral lip extending outwardly along the entire periphery defined by the first and second legs and the connecting portion for sealing against the housing wall, the peripheral lip including each said lip portion.

10. An electrical device including the grommet of claim 1.

11. An electrical device comprising a housing including a wall and at least one hole defined through and surrounded by the wall, and a grommet including first and second legs connected by a connecting portion, a slit extending at least partially between the first and second legs, and at least one aperture for engagingly receiving at least one electrical connector therethrough, the first and second legs having flange portions and lip portions extending outwardly from the first and second legs' end portions generally opposite the connecting portion, the flange and lip portions collectively defining at least one groove for receiving a portion of the housing wall, whereby the grommet can be inserted into the hole after the housing has been assembled for sealing against the housing wall and the electrical connector within the aperture to thereby inhibit the ingress of moisture through the hole.

12. The device of claim 11 wherein the grommet includes an inner body portion having a periphery adapted to be inserted through the hole, and an outer body portion having a periphery complementary in shape to but larger than the inner body portion's periphery.

13. The device of claim 11 wherein the connecting portion is generally curved with the first and second legs depending therefrom such that the grommet has a generally U-shaped profile.

14. The device of claim 11 wherein the hole is generally D-shaped with inwardly tapered side portions for compressively squeezing the grommet's legs towards one another.

15. The device of claim 11 wherein the housing is a clamshell housing having first and second clamshell portions, and wherein the hole is defined and surrounded entirely by a wall of the first clamshell portion such that the hole is spaced apart from an interface between the first and second clamshell portions.

16. The device of claim 11 wherein the grommet's flange portions are beveled to facilitate positioning of the flange portions through the hole.

17. The device of claim 11 wherein the grommet's connecting portion includes a flange portion and a lip portion collectively defining at least one groove for receiving a portion of the housing wall.

18. The device of claim 17 wherein the first and second legs' flange portions are each spaced apart from the connecting portion's flange portion such that a relief is defined therebetween for facilitating positioning of the grommet within the hole.

19. The device of claim 11 wherein the grommet, when positioned within the hole, is in contacting engagement with the housing wall along an entire periphery of the hole.

20. The device of claim 11 wherein the grommet includes an outer peripheral lip extending outwardly along the entire periphery defined by the first and second legs and the connecting portion for sealing against the housing wall, the peripheral lip including each said lip portion.

21. A method of assembling a grommet within a hole defined through and surrounded by a housing wall of an electrical device, the grommet including first and second legs connected by a connecting portion, a slit extending at least partially between the first and second legs, and at least one aperture for engagingly receiving at least one electrical connector therethrough, the first and second legs having flange portions and lip portions extending outwardly from the first and second leg's end portions generally opposite the connecting portion, the flange and lip portions collectively defining at least one groove for receiving a portion of the housing wall, the method comprising:

positioning at least one electrical connector within the grommet's aperture; and positioning the grommet within the hole from outside the electrical device, whereby the grommet seals against the housing wall and the electrical connector to thereby inhibit the ingress of moisture through the hole.

22. The method of claim 21 wherein the housing is a clamshell housing having first and second clamshell portions, and wherein the method includes coupling the first clamshell portion to the second clamshell portion before positioning the grommet within the hole.

23. The method of claim 21 wherein the electrical lead is positioned within the aperture before the grommet is positioned within the hole.

* * * * *